(12) United States Patent
Jordan

(10) Patent No.: US 7,892,295 B2
(45) Date of Patent: Feb. 22, 2011

(54) 1.3-THIAZOLYL AZO DYES, THEIR PREPARATION AND USE

(75) Inventor: Hartwig Jordan, Bergisch-Gladbach (DE)

(73) Assignee: DyStar Colours Deutschland GmbH, Frankfurt am Main (DE)

( * ) Notice: Subject to any disclaimer, the term of this patent is extended or adjusted under 35 U.S.C. 154(b) by 0 days.

(21) Appl. No.: 12/672,602

(22) PCT Filed: Aug. 1, 2008

(86) PCT No.: PCT/EP2008/060113

§ 371 (c)(1),
(2), (4) Date: Apr. 7, 2010

(87) PCT Pub. No.: WO2009/019206

PCT Pub. Date: Feb. 12, 2009

(65) Prior Publication Data

US 2010/0205755 A1    Aug. 19, 2010

(30) Foreign Application Priority Data

Aug. 9, 2007   (DE)   ........... 10 2007 037 524

(51) Int. Cl.
*D06P 5/17* (2006.01)
*C09B 44/10* (2006.01)

(52) U.S. Cl. .............. 8/456; 8/464; 8/466; 8/570; 8/571; 8/575; 534/607

(58) Field of Classification Search ........ 8/456, 8/464, 466, 570, 571, 575; 534/607
See application file for complete search history.

(56) References Cited

U.S. PATENT DOCUMENTS

| | | | |
|---|---|---|---|
| 3,380,990 A * | 4/1968 | Straley et al. | 534/645 |
| 4,542,207 A | 9/1985 | Niwa et al. | |
| 5,194,598 A | 3/1993 | Hamprecht | |
| 5,550,218 A | 8/1996 | Altermatt | |

FOREIGN PATENT DOCUMENTS

| DE | 3313797 A1 | 10/1983 |
|---|---|---|
| DE | 4121754 A1 | 1/1992 |
| EP | 0313918 A2 | 5/1989 |
| EP | 0352006 A2 | 1/1990 |
| EP | 0453020 A1 | 10/1991 |
| EP | 0578870 A1 | 1/1994 |
| GB | 2071684 A | 9/1981 |
| JP | 59-213765 A | 12/1984 |
| JP | 03-256793 A | 11/1991 |

OTHER PUBLICATIONS

STIC Search Report dated Sep. 21, 2010.*

* cited by examiner

*Primary Examiner*—Eisa B Elhilo
(74) *Attorney, Agent, or Firm*—Connolly Bove Lodge & Hutz LLP

(57) ABSTRACT

A disperse dye of formula (I):

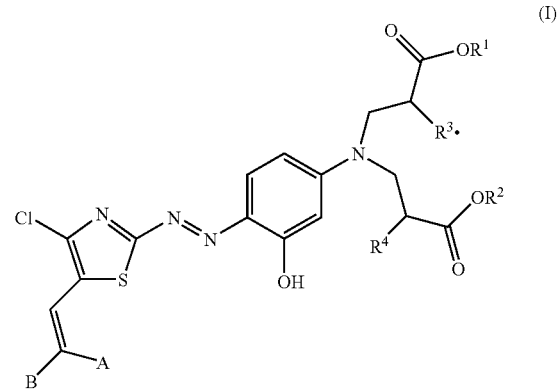

Wherein $R^1$ and $R^2$ independently are each ($C_1$-$C_4$)-alkyl, OH or ($C_1$-$C_4$)-alkoxy-substituted ($C_1$-$C_4$)-alkyl; $R^3$ and $R^4$ independently are each hydrogen or methyl; one of A and B is cyano and the other is —COOX; and X is ($C_2$-$C_{12}$)-alkyl, O-interrupted ($C_2$-$C_{12}$)-alkyl, ($C_3$-$C_4$)-alkenyl or phenyl-($C_1$-$C_4$)-alkyl. The invention also relates to the preparation of the dye and the use of the dye.

7 Claims, No Drawings

1.3-THIAZOLYL AZO DYES, THEIR PREPARATION AND USE

CROSS-REFERENCE TO RELATED APPLICATIONS

This application is a national stage application (under 35 U.S.C. §371) of PCT/EP2008/060113, filed Aug. 1, 2008, which claims benefit of German application 10 2007 037524.9, filed Aug. 9, 2007.

BACKGROUND OF THE INVENTION

The present invention relates to disperse azo dyes comprising a 1,3-thiazolyl diazo component.

Azo dyes comprising this diazo component are already known and are described for example in GB 2 071 684 A, DE 33 13 797 A1, EP 0 352 006 A2, EP 0 453 020 A1, DE 41 21 754 A1 and EP 0 578 870 A1. The dyes described in GB 2 071 684 A and EP 0 352 006 A2 comprise specifically substituted thiazolyl diazo components and in the latter case are also notable for high lightfastness.

EP 0 313 918 A2 discloses red-dyeing disperse azo dyes comprising a dialkoxycarbonylalkylaminophenol as coupling component.

BRIEF SUMMARY OF THE INVENTION

It has now been found that, surprisingly, dyes comprising 1,3-thiazolyl diazo components as described in GB 2 071 684 A or EP 0 352 006 A2 and coupling components as described in EP 0 313 918 A2 display excellent wetfastnesses as well as good lightfastness. This makes it possible to meet market demands for blue dyeings having excellent wetfastnesses and good lighffastnesses.

The present invention accordingly provides disperse dyes of formula I

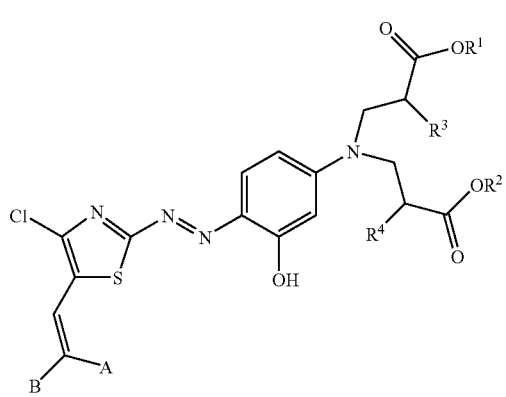

(I)

where
$R^1$ and $R^2$ are each $(C_1-C_4)$-alkyl or OH or $(C_1-C_4)$-alkoxy-substituted $(C_1-C_4)$-alkyl;
$R^3$ and $R^4$ are each hydrogen or methyl;
one of A and B is cyano and the other is —COOX; and
X is $(C_2-C_{12})$-alkyl, O-interrupted $(C_2-C_{12})$-alkyl, $(C_3-C_4)$-alkenyl or phenyl-$(C_1-C_4)$-alkyl.

DETAILED DESCRIPTION OF THE INVENTION $(C_1-C_4)$-Alkyl groups may be straight chain or branched and are for example methyl, ethyl, n-propyl, i-propyl, n-butyl, isobutyl or tert-butyl. Analogous considerations apply to alkoxy groups, which are for example methoxy or ethoxy.

$(C_2-C_{12})$-Alkyl groups may likewise be straight chain or branched and as well as the meanings mentioned above for $(C_1-C_4)$-alkyl may also be for example n-pentyl, n-hexyl, n-heptyl, n-octyl, n-nonyl, n-decyl, n-undecyl or n-dodecyl or corresponding branched-chain groups.

O-Interrupted $(C_2-C_{12})$-alkyl groups conform to the formula $H_3C-(CH_2)_n-O-(CH_2)_m-$, where n is from 0 to 10, m is from 1 to 11 and m+n is from 1 to 11. Preferably, n is 0 to 2 and m is 2.

$(C_3-C_4)$-Alkenyl groups are in particular allyl, while phenyl-$(C_1-C_4)$-alkyl groups are in particular benzyl and phenethyl.

The disperse dyes of formula (I) comprise in particular disperse dyes of formula (Ia)

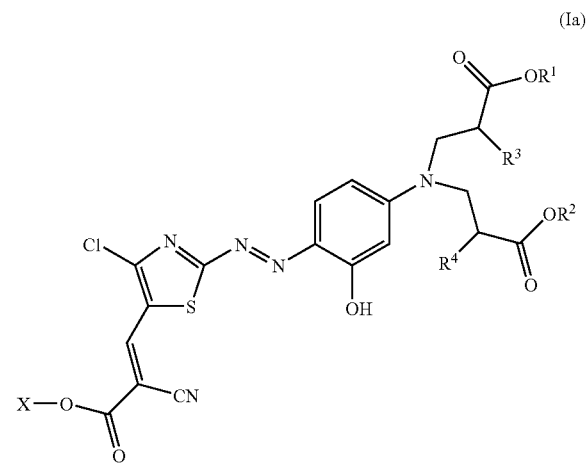

(Ia)

but also disperse dyes of formula (Ib)

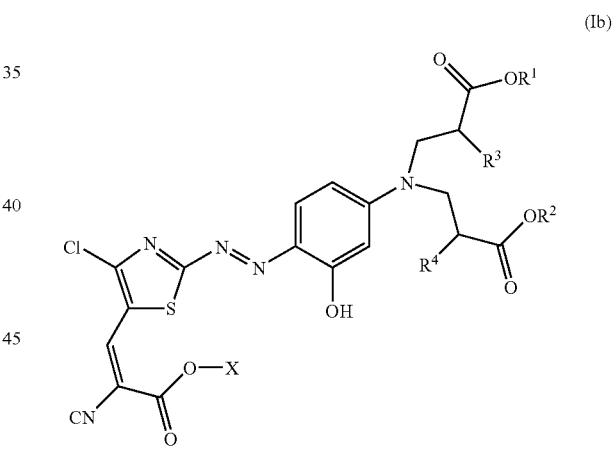

(Ib)

where in either case R1 to R4 and X are each as defined above.

Particularly preferred disperse dyes of formula (I) conform to formula (Ic)

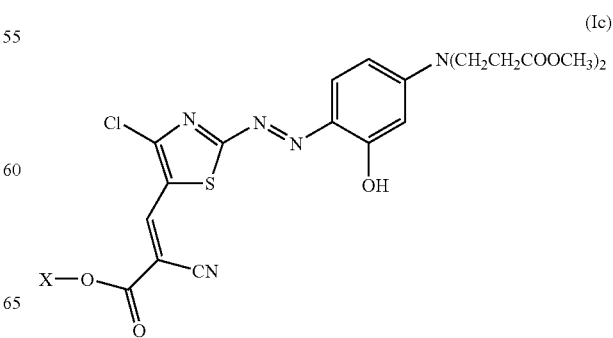

(Ic)

where X is as defined above and is in particular ethyl, n-propyl, n-butyl, isobutyl, tert-butyl, n-pentyl, n-hexyl, n-octyl, methoxyethyl, ethoxyethyl, i-propoxyethyl, n-butoxyethyl, allyl or benzyl.

The present invention's dyes of the general formula (I) are obtainable by methods known to one skilled in the art. For instance, a compound of the general formula (II)

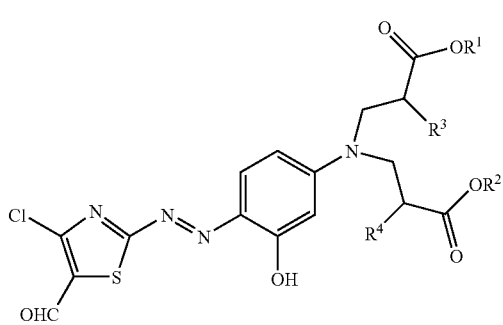

where $R^1$ to $R^4$ are each as defined above, can be condensed with an alkyl cyanoacetate of formula (III)

where X is as defined above, to form a disperse dye of formula (I) according to the present invention.

This reaction may be carried out for example by the procedure described in EP 0 578 870 A1.

However, it will be found particularly advantageous in relation to the purity of the products and ease of isolation for the condensation to be carried out in an alcohol, which may contain water, in the presence of sodium acetate. Preferred alcohols are methanol and ethanol. The water content can be 0-40%, preferably 0-10%. The reaction is ideally carried out at room temperature.

The indicated process leads to the preferential formation of disperse dyes of formula (Ia), i.e., to compounds having an E-configuration at the olefinic double bond. This can be confirmed by an NMR-J-HMBC experiment, in which the olefinic proton is found to have coupling constants between 6 and 7 Hz with the carbonyl carbon and between 1.3 and 14 Hz with the nitrile carbon.

Separating the disperse dyes of formulae (Ia) and (Ib) is not necessary for their hereinbelow described use as dyes, but can of course be done if desired using the customary methods.

The compounds of formula (II) are obtainable by diazotization of the amine of formula (IV)

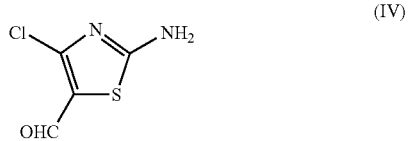

and coupling onto a compound of formula (V)

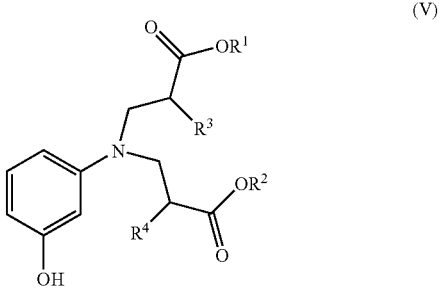

where $R^1$ to $R^4$ are each as defined above.

The compounds of formula (IV) are generally diazotized in a known manner, for example with nitrosylsulfuric acid in dilute sulfuric acid, phosphoric acid or a mixture of acetic and propionic acids. The preferred temperature range is between −10° C. and 10° C.

The diazotized compounds are generally likewise coupled onto the compounds of formula (V) in a known manner, for example in an acidic, aqueous, aqueous-organic or organic medium, with particular advantage at temperatures below 10° C. Acids used in particular are sulfuric acid, acetic acid or propionic acid.

The amine of formula (IV) is known and is obtainable for example as described in GB 2 071 684 A.

The compounds of formula (V) are likewise known and are obtainable for example after M. Lipp et al., Chem. Ber. 1958, 91, 2239 ff. The reaction mixture obtained in acetic acid can be used directly.

The present invention's disperse dyes of the general formula (I) are outstandingly useful for dyeing and printing hydrophobic materials, giving violet to blue dyeings and prints having outstanding wash- and perspiration fastnesses. This holds in particular also for polyester microfibers and polyester-containing blend fabrics, for example with cotton and elastane.

It has further been determined that the disperse dyes of the present invention are outstandingly useful for the continuous dyeing of polyester-cotton blends as used for workwear for example. The wetfastnesses achieved, in particular according to the "Hoechst combination test" are outstanding. In the Hoechst combination test, the dyed textile is exposed to a contact heat of 160-190° C. for 5-10 min and subsequently subjected to the ISO 105 C05 or ISO 105-C06 E2 washfastness tests. This simulates the conditions of industrial laundering, where the cleaned textile material is dried in a dry steam apparatus at very high temperatures. In this operation, dye can migrate to the surface and cause staining or tainting of adjacent fabric in subsequent washes. The dyes of the present invention here are notable for extremely low staining or tainting.

The present invention thus also provides for the use of disperse dyes of the general formula I for dyeing and printing hydrophobic materials, and processes for dyeing or printing such materials in conventional procedures which utilize as colorants one or more disperse dyes of the general formula (I) according to the present invention.

The hydrophobic materials mentioned can be of synthetic or cellulosic origin. Hydrophobic materials contemplated include for example secondary cellulose acetate, cellulose triacetate, polyamides and, in particular, macromolecular polyesters. Materials composed of macromolecular polyester are in particular those based on polyethylene glycol terephthalates.

The hydrophobic synthetic materials may be in the form of sheet- or thread-shaped structures and may have been processed for example into yarns or woven or knit textile fabrics. Preference is given to fibrous textile materials, which can also be present in the form of microfibers for example.

The dyeing in accordance with the use according to the present invention can be effected in a conventional manner, preferably from an aqueous dispersion, if appropriate in the presence of carriers, between 80 to about 110° C. by the exhaust method or by the HT method in a dyeing autoclave at 110 to 140° C., and also by the so-called thermofix method in which the fabric is padded with the dyeing liquor and subsequently fixed/set at about 180 to 230° C.

Printing of the materials mentioned can be carried out in a manner known per se by incorporating the disperse dyes of the general formula (I) of the present invention in a print paste and treating the fabric printed therewith at temperatures between 180 to 230° C. with HT steam, high-pressure steam or dry heat, if appropriate in the presence of a carrier, to fix the dye.

The disperse dyes of the general formula (I) of the present invention shall be in a very fine state of subdivision when they are used in dyeing liquors, padding liquors or print pastes.

The dyes are converted into the fine state of subdivision in a conventional manner by slurrying the as-fabricated dye together with dispersants in a liquid medium, preferably in water, and subjecting the mixture to the action of shearing forces to mechanically comminute the original dye particles to such an extent that an optimal specific surface area is achieved and sedimentation of the dye is minimized. This is accomplished in suitable mills, such as ball or sand mills. The particle size of the dyes is generally between 0.5 and 5 µm and preferably equal to about 1 µm.

The dispersants used in the milling operation can be nonionic or anionic. Nonionic dispersants include for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained shall be pourable for most applications. Accordingly, the dye and dispersant content is limited in these cases. In general, the dispersions are adjusted to a dye content up to 50 percent by weight and a dispersant content up to about 25 percent by weight. For economic reasons, dye contents are in most cases not below 15 percent by weight.

The dispersions may also contain still further auxiliaries, for example those which act as oxidizing agents, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders comprise the dye, dispersants and other auxiliaries, for example wetting, oxidizing, preserving and dustproofing agents and the abovementioned "acid donors".

A preferred method of making pulverulent preparations of dye consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 1:5 to 1:50 is obtained for dyeing. In addition, it is generally customary to include further dyeing auxiliaries, such as dispersing, wetting and fixing auxiliaries, in the liquors. Organic and inorganic acids such as acetic acid, succinic acid, boric acid or phosphoric acid are included to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye or dye mixture in textile printing, the requisite amounts of the abovementioned dye formulations are kneaded in a conventional manner together with thickeners, for example alkali metal alginates or the like, and if appropriate further additives, for example fixation accelerants, wetting agents and oxidizing agents, to give print pastes.

The present invention also provides inks for digital textile printing by the ink jet process, comprising a present invention disperse dye of the general formula (I).

The inks of the present invention are preferably aqueous and comprise one or more of the present invention's disperse dyes of the general formula (I), for example in amounts of 0.1% to 50% by weight, preferably in amounts of 1% to 30% by weight and more preferably in amounts of 1% to 15% by weight based on the total weight of the ink.

They further comprise in particular from 0.1% to 20% by weight of a dispersant. Suitable dispersants are known to one skilled in the art, are commercially available and include for example sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes and reaction products of alkylene oxides with alkylatable compounds, for example fatty alcohols, fatty amines, fatty acids, carboxamides and substituted or unsubstituted phenols.

The inks of the present invention may further comprise customary additives, for example viscosity moderators to set viscosities in the range from 1.5 to 40.0 mPas in a temperature range of 20 to 50° C. Preferred inks have a viscosity in the range from 1.5 to 20 mPas and particularly preferred inks have a viscosity in the range from 1.5 to 15 mPas.

Useful viscosity moderators include rheological additives, for example polyvinyl-caprolactam, polyvinylpyrrolidone and also their copolymers, polyetherpolyol, associative thickeners, polyurea, sodium alginates, modified galactomannans, polyetherurea, polyurethane and nonionic cellulose ethers.

By way of further additives, the inks of the present invention may include surface-active substances to set surface tensions in the range from 20 to 65 mN/m, which are if appropriate adapted depending on the process used (thermal or piezo technology). Useful surface-active substances include for example surfactants of any kind, preferably nonionic surfactants, butyldiglycol and 1,2 hexanediol.

The inks may further include customary additives, for example materials to inhibit fungal and bacterial growth in amounts from 0.01% to 1% by weight based on the total weight of the ink.

The inks of the present invention can be prepared in conventional manner by mixing the components in water.

The examples which follow elucidate the invention. Parts are by weight.

Example 1 a) To a mixture of 808 parts of acetic acid and 199 parts of propionic acid are added 100 parts of 2-amino-4-chloro-5-formyl-1,3-thiazole (compound of formula (IV)). After 30 min of subsequent stirring the temperature is lowered to 0° C. Then, 205 parts of 40% nitrosylsulfuric acid are added dropwise to the yellow suspension over 2 h while a temperature of 0-2° C. is maintained. Stirring is continued at that temperature for 3 h.

335.3 parts of a solution rendered acidic with acetic acid and containing 51.6% by weight of methyl 3-[(3-hydroxyphenyl)-(2-methoxycarbonylethyl)amino]propionate is presented as an initial charge in 1503 parts of methanol. 400 parts of an 18% by weight aqueous solution of amidosulfonic acid and 1250 parts of ice are added. The diazotization mixture is added dropwise, starting at −12° C., to this coupler solution over 30 min, during which the temperature rises to −1° C. The mixture is subsequently stirred for 15 min and then adjusted to pH 4.2 with about 930 parts of 30% by weight aqueous sodium hydroxide solution. The temperature is maintained below 10° C. by addition of about 1240 parts of ice. After stirring overnight the precipitate is filtered off with suction. The strongly salt-containing suction filter cake is resuspended in 1500 parts of water and stirred for 2 h. 228.5 parts of a compound of formula (IIa) are obtained after filtration with suction, washing with water and drying. This corresponds to a yield of 81.7% of theory.

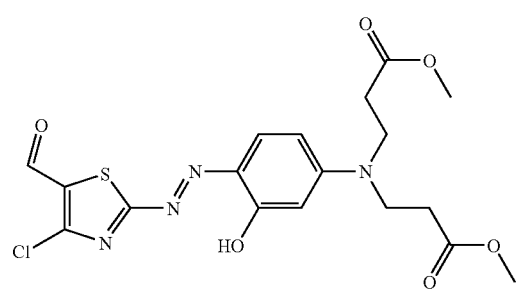

(IIa)

b) 25 parts of the compound (IIa) are suspended in 314 parts of ethanol and stirred for 30 min. 5.5 parts of anhydrous sodium acetate and 21.85 parts of propyl cyanoacetate are added. The mixture is subsequently stirred overnight. Completeness of reaction is tested by means of thin layer chromatography. After the reaction is complete, the solids are filtered off with suction and washed with ethanol and water to leave, after drying, 18.55 parts of the dye of the following formula, which corresponds to 60% of theory:

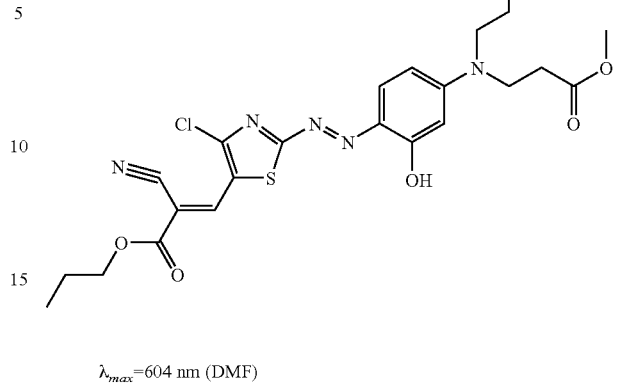

$\lambda_{max}$=604 nm (DMF)

The subsequent disperse dyes of Examples 2 to 16 are also obtainable similarly to the procedures described in Example 1.

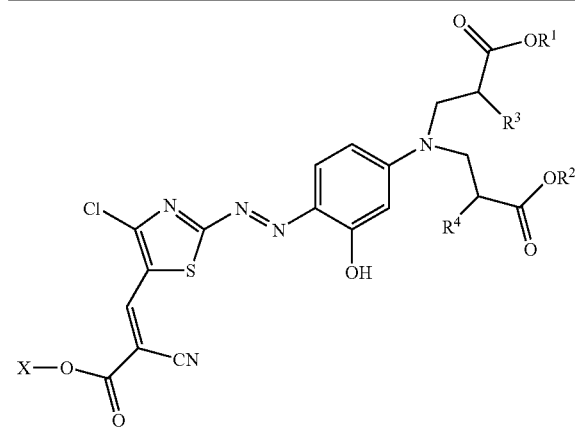

| Example | X | $R^1 = R^2$ | $R^3 = R^4$ | $\lambda_{max}$ (DMF) [nm] |
|---|---|---|---|---|
| 2 | Ethyl | Me | H | 604 |
| 3 | Ethyl | Et | H | 603 |
| 4 | Ethyl | Me | Me | 606 |
| 5 | Allyl | Me | H | 600 |
| 6 | n-Butyl | Me | H | 600 |
| 7 | iso-Butyl | Me | H | 606 |
| 8 | tert-Butyl | Me | H | 602 |
| 9 | n-Pentyl | Me | H | 604 |
| 10 | n-Hexyl | Me | H | 604 |
| 11 | n-Octyl | Me | H | 604 |
| 12 | Benzyl | Me | H | 604 |
| 13 | $CH_2CH_2OMe$ | Me | H | 604 |
| 14 | $CH_2CH_2OEt$ | Me | H | 606 |
| 15 | $CH_2CH_2O$-i-Pr | Me | H | 606 |
| 16 | $CH_2CH_2O$-n-Bu | Me | H | 604 |

Example 17

30 g of the dye obtained according to Example 1 (in the form of the water-moist presscake) are admixed in 200 ml of water with 63 g of sodium ligninsulfonate and 3 g of a nonionic dispersant (addition product of abietic acid and 50 molar equivalents of ethylene oxide) and adjusted to pH 7 with 25% sulfuric acid. This is followed by bead milling at room temperature for 1 h (90%<1 μm), sieving and drying in a spray dryer.

2 g of the powder thus obtained are dispersed in 1000 g of water. The dispersion is admixed with 0.5 to 2 g per l of liquor of a commercially available dispersant based on a condensation product of naphthalenesulfonic acid sodium salt and formaldehyde, 0.5 to 2 g per l of liquor of monosodium phosphate and 2 g per l of liquor of a commercially available leveling assistant and adjusted to pH 4.5 to 5.5 with acetic acid. The dyeing liquor thus obtained is entered with 100 g of a textured polyester fabric based on polyethylene glycol terephthalate and dyeing is carried out at 130° C. for 60 min. Reduction clearing leaves a reddish blue dyeing of excellent wash- and perspiration fastness and very good sublimation fastness.

Repeating Example 17 with the dyes of Examples 2 to 16 likewise gives violet to blue dyeings having excellent wet-fastnesses.

Example 18

The dye of Example 16 is ground and spray dried as described in the first part of Example 17. The dye thus obtained is applied to a polyester-cotton blend fabric by the thermosol process. To this end, a dye pad containing 30 g/l of the above-described disperse dye, 30 g/l of a blue vat dye, 2 g/l of SERA® Wet C-AS wetting agent, 10 g/l of SERA® Gal M-IP anti-migration agent and 0.5 ml/l of acetic acid 60% is made up. A wet pickup of 60-80% is set. After the fabric has passed through the pad-mangle, it is dried at 120° C. for 1-3 min. This is followed by thermosoling at 210-225° C. for 60 s. Thereafter, the fabric is passed through a chemical pad containing 60-120 ml of 38° Bé caustic soda and 35-70 g/l of hydrosulfite (the amounts depend on the amount of vat dye use. Wet pickup shall be 70-100%. This is followed by steaming at 102° C. for 1 min. The fabric is subsequently finalized by means of rinse cycles, oxidation with 50% hydrogen peroxide, soaping with 1 g/l of SERA® Sperse C—SN sequestrant at 98° C. and acidifying to pH 5-6. After 2 further water rinse baths the fabric is dried.

The reddish blue dyeing thus obtained has excellent wash-fastnesses, meeting in particular the requirements of the "Hoechst combination test". Similar results are obtained with the dyes of Examples 1-15.

Example 19

A textile fabric consisting of polyester is padded with a liquor consisting of 50 g/l of 8% sodium alginate solution, 100 g/l of 8-12% carob flour ether solution and 5 g/l of monosodium phosphate in water and then dried. The wet pickup is 70%.

The textile thus pretreated is then printed with an aqueous ink prepared in accordance with the procedure described above and containing 3.5% of the dye of Example 1, 2.5% of Disperbyk 190 dispersant, 30% of 1,5-pentanediol, 5% of diethylene glycol monomethyl ether, 0.01% of Mergal K9N biocide, and 58.99% of water using a drop-on-demand (piezo) ink jet print head. The print is fully dried. Fixing is effected by means of superheated steam at 175° C. for 7 minutes. The print is subsequently subjected to an alkaline reduction clear, rinsed warm and then dried.

What is claimed is:

1. A disperse dye of formula I

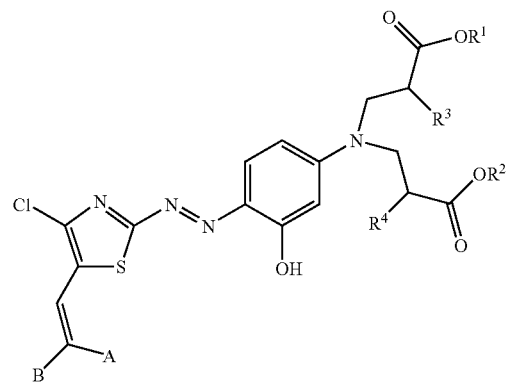

wherein
$R^1$ and $R^2$ independently are each $(C_1$-$C_4)$-alkyl or OH or $(C_1$-$C_4)$-alkoxy-substituted $(C_1$-$C_4)$-alkyl;
$R^3$ and $R^4$ independently are each hydrogen or methyl;
one of A and B is cyano and the other is —COOX; and
X is $(C_2$-$C_{12})$-alkyl, O-interrupted $(C_2$-$C_{12})$-alkyl, $(C_3$-$C_4)$-alkenyl or phenyl-$(C_1$-$C_4)$-alkyl.

2. The disperse dye as claimed in claim 1 conforming to formula (Ia)

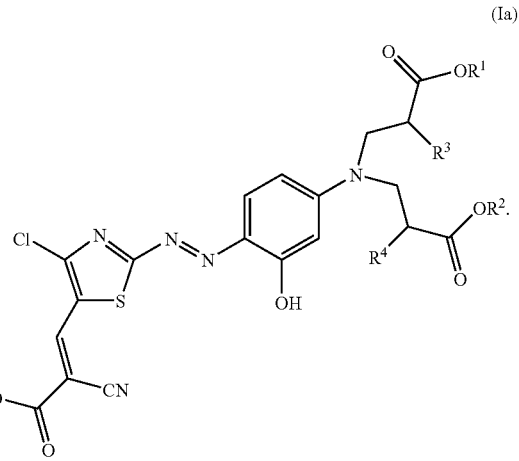

3. The disperse dye as claimed in claim 1 conforming to formula (Ic)

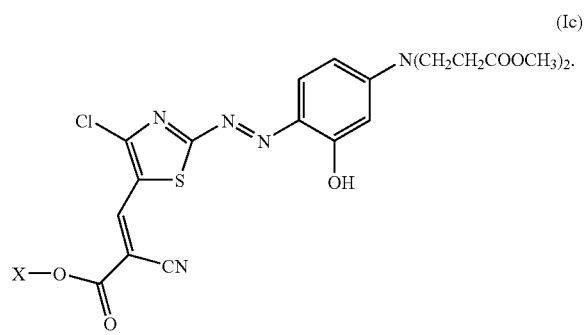

4. The disperse dye as claimed in claim 1 wherein X is ethyl, n-propyl, n-butyl, isobutyl, tert-butyl, n-pentyl, n-hexyl, n-octyl, methoxyethyl, ethoxyethyl, i-propoxyethyl, n-butoxyethyl, allyl or benzyl.

5. A process for preparing a disperse dye of the formula (I) as claimed in claim 1, which comprises condensing a compound of the formula (II)

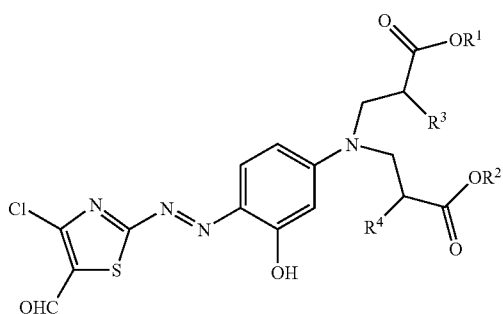

with an alkyl cyanoacetate of formula (III)

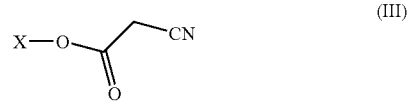

where X is as defined in claim 1.

6. A process for dyeing and printing a hydrophobic material which comprises contacting the dye as claimed in claim 1 with the material.

7. An ink for digital textile printing by the ink jet process, comprising the disperse dye of the formula (I) as claimed in claim 1.

* * * * *